US011812692B2

(12) United States Patent
Pan

(10) Patent No.: US 11,812,692 B2
(45) Date of Patent: Nov. 14, 2023

(54) SHEET-METAL SPINNING CUTTER BAR ASSEMBLY AND PROCESSING METHOD THEREOF

(71) Applicant: Zhejiang Dongxing Auto Parts CO., LTD, Zhejiang (CN)

(72) Inventor: Zhaoxing Pan, Zhejiang (CN)

(73) Assignee: Zhejiang Dongxing Auto Parts CO., LTD, Zhejiang (CN)

( * ) Notice: Subject to any disclaimer, the term of this patent is extended or adjusted under 35 U.S.C. 154(b) by 513 days.

(21) Appl. No.: 16/950,879

(22) Filed: Nov. 17, 2020

(65) Prior Publication Data

US 2022/0078970 A1 Mar. 17, 2022

(30) Foreign Application Priority Data

Sep. 17, 2020 (CN) .......................... 202010982877.0
Sep. 17, 2020 (CN) .......................... 202022043302.0

(51) Int. Cl.
*A01D 34/76* (2006.01)
*B23D 47/12* (2006.01)
*F16H 7/20* (2006.01)
*F16C 17/10* (2006.01)
*A01D 101/00* (2006.01)

(52) U.S. Cl.
CPC ............. *A01D 34/76* (2013.01); *B23D 47/12* (2013.01); *F16C 17/10* (2013.01); *F16H 7/20* (2013.01); *A01D 2101/00* (2013.01)

(58) Field of Classification Search
CPC ............ A01D 2101/00; A01D 34/6806; A01D 34/73; F16C 19/54; F16D 1/06; F16H 7/02; F16H 57/0025

USPC ........................................................ 474/198
See application file for complete search history.

(56) References Cited

U.S. PATENT DOCUMENTS

| 406,153 | A | * | 7/1889 | Sullivan | .................... | D01H 4/08 |
| | | | | | | 254/285 |
| 2,361,961 | A | * | 11/1944 | Pruitt | ...................... | B23D 45/10 |
| | | | | | | 451/365 |
| 2,551,817 | A | * | 5/1951 | Taylor | ...................... | A01D 34/74 |
| | | | | | | 56/255 |
| 2,637,966 | A | * | 5/1953 | Richey | ................... | A01D 34/07 |
| | | | | | | 56/10.4 |
| 2,700,264 | A | * | 1/1955 | Settler | .................. | A01D 34/475 |
| | | | | | | 56/250 |
| 2,897,707 | A | * | 8/1959 | Curts, Jr. | ................ | B21F 23/00 |
| | | | | | | 82/127 |
| 3,051,010 | A | * | 8/1962 | Blomgren | .............. | A01B 71/00 |
| | | | | | | 474/198 |

(Continued)

*Primary Examiner* — Henry Y Liu

(74) *Attorney, Agent, or Firm* — JCIP GLOBAL INC.

(57) ABSTRACT

A sheet-metal spinning cutter bar assembly includes a cutter bar body. One end of the cutter bar body is provided is provided with a pulley through a screw. The cutter bar body includes a bearing seat. Two ends of the bearing seat are respectively provided with bearings. A mandrel is inserted into the bearing seat, and a tail end of the mandrel is connected with the pulley. The pulley is provided with a plurality of sets of lightening holes. A fixing plate and a supporting plate are arranged on the bearing seat, which are connected by interference fit and welding, and are provided with reinforcing ribs. A processing method of the sheet-metal spinning cutter bar assembly is also provided.

8 Claims, 3 Drawing Sheets

(56) References Cited

U.S. PATENT DOCUMENTS

| | | | | |
|---|---|---|---|---|
| 3,334,523 | A * | 8/1967 | Rieser | B65G 39/02 474/197 |
| 3,677,523 | A * | 7/1972 | Hartley | B28C 1/18 241/97 |
| 3,722,642 | A * | 3/1973 | Zurek | F16D 67/00 192/16 |
| 3,785,217 | A * | 1/1974 | Peura | B60B 33/0063 474/190 |
| 3,798,987 | A * | 3/1974 | Hurd | A01D 34/81 474/174 |
| 3,813,998 | A * | 6/1974 | Lotto | B31B 70/00 493/204 |
| 3,875,728 | A * | 4/1975 | Bacon | A01D 34/81 384/480 |
| 3,916,706 | A * | 11/1975 | Shaw | A01D 34/76 474/199 |
| 3,967,438 | A * | 7/1976 | Tombers | A01D 75/20 192/223.3 |
| 4,034,616 | A * | 7/1977 | Rauscher | F16H 55/48 474/902 |
| 4,107,906 | A * | 8/1978 | Cousino | A01D 34/30 56/17.6 |
| 4,478,029 | A * | 10/1984 | Moore | A01D 34/73 56/255 |
| 4,942,725 | A * | 7/1990 | Ruder, Sr. | A01D 34/30 56/17.6 |
| 4,989,398 | A * | 2/1991 | Kuhn | A01D 34/76 474/199 |
| 5,117,617 | A * | 6/1992 | Scag | A01D 34/81 384/128 |
| 5,274,987 | A * | 1/1994 | Wiener | A01D 34/73 56/14.8 |
| 5,481,857 | A * | 1/1996 | Umemoto | A01D 34/81 56/15.8 |
| 5,483,790 | A * | 1/1996 | Kuhn | A01D 34/826 56/320.1 |
| 5,507,586 | A * | 4/1996 | Myszka | F16D 1/06 474/903 |
| 5,664,917 | A * | 9/1997 | Judy | B23Q 5/045 409/215 |
| 5,782,073 | A * | 7/1998 | Sheldon | A01D 34/6806 56/255 |
| 5,877,129 | A * | 3/1999 | Yatsuzuka | C10M 133/56 508/156 |
| 5,884,463 | A * | 3/1999 | Darzinskis | A01D 34/82 56/255 |
| 5,960,617 | A * | 10/1999 | Sheldon | A01D 34/6806 56/255 |
| 5,976,043 | A * | 11/1999 | Hise | F16H 7/24 474/198 |
| 6,286,293 | B1 * | 9/2001 | Scag | A01D 34/6806 56/255 |
| 6,575,839 | B1 * | 6/2003 | Brandon | A01D 34/6806 464/178 |
| 6,688,095 | B2 * | 2/2004 | Wadzinski | A01D 34/6806 56/255 |
| 7,299,613 | B2 * | 11/2007 | Samejima | A01D 34/005 56/6 |
| 7,617,665 | B2 * | 11/2009 | Yamashita | A01D 34/005 56/320.2 |
| 9,699,960 | B2 * | 7/2017 | Schreiner | A01D 34/005 |
| 9,756,782 | B2 * | 9/2017 | Andre | A01D 34/69 |
| 9,924,632 | B2 * | 3/2018 | Chenevert | A01D 34/733 |
| 10,123,479 | B2 * | 11/2018 | Ladd, Jr. | A01D 34/835 |
| 10,405,487 | B2 * | 9/2019 | Smith | A01D 34/005 |
| 2003/0094849 | A1 * | 5/2003 | Joki | F16C 35/063 301/105.1 |
| 2005/0081501 | A1 * | 4/2005 | Pellenc | A01G 17/026 56/330 |
| 2006/0052193 | A1 * | 3/2006 | Davis | A01D 34/76 474/135 |
| 2006/0260861 | A1 * | 11/2006 | Ohashi | B62D 12/00 180/305 |
| 2007/0075581 | A1 * | 4/2007 | Slesinski | F16C 33/6614 301/124.1 |
| 2007/0151222 | A1 * | 7/2007 | Iida | A01D 69/06 56/157 |
| 2012/0129637 | A1 * | 5/2012 | Blanchard | A01D 34/69 474/116 |
| 2013/0079182 | A1 * | 3/2013 | Raasch | F16H 55/56 474/174 |
| 2018/0343794 | A1 * | 12/2018 | Self | A01D 34/4165 |

* cited by examiner

SHEET-METAL SPINNING CUTTER BAR ASSEMBLY AND PROCESSING METHOD THEREOF

CROSS-REFERENCE TO RELATED APPLICATION

This application claims the priority benefit of China application serial no. 202010982877.0, and no. 202022043302.0, filed on Sep. 17, 2020. The entirety of each of the above-mentioned patent applications is hereby incorporated by reference herein and made a part of this specification.

BACKGROUND

Technical Field

The disclosure relates to the field of cutter bar assembly applied to a lawn mower, in particular to a sheet-metal spinning cutter bar assembly and a processing method thereof.

Description of Related Art

With the development of garden machinery industry, reducing cost and saving energy consumption has become the primary consideration of each pulley factory. Therefore, saving materials, reducing cost and reducing component weight without affecting product quality and service life has become the key technology in the competition of garden machinery industry.

When the lawn mower works, the cutter bar assembly rotates at high speed and is prone to touch the stone on the ground or grass, which requires higher overall connection strength of the cutter bar assembly.

SUMMARY

In the view of above problems, the disclosure is proposed to provide a sheet-metal spinning cutter bar assembly with high strength and long service life and a processing method thereof.

In order to solve the above technical problems, the present invention adopts the following technical solutions.

A sheet-metal spinning cutter bar assembly comprises a cutter bar body, and one end of the cutter bar body is provided with a pulley through a fixing screw. The cutter bar body comprises a bearing seat, two ends of the bearing seat are respectively provided with bearings, a mandrel is inserted into the bearing seat, and a tail end of the mandrel is connected with the pulley.

In the sheet-metal spinning cutter bar assembly, the two ends of the bearing seat are respectively provided with first steps, and the bearings are respectively clamped on the first steps.

In the sheet-metal spinning cutter bar assembly, a shaft sleeve is arranged between the two bearings, and the shaft sleeve is arranged between the mandrel and the bearing seat. A cavity is arranged between the shaft sleeve and an inner wall of the bearing seat, a yellow grease layer is filled in the cavity, and 30%-60% of the cavity is filled with yellow grease.

In the sheet-metal spinning cutter bar assembly, a top end of the mandrel is provided with a baffle ring, a bottom portion of the baffle ring abuts against the bearing, and a top portion of the baffle ring is provided with a connecting platform for fixing a blade.

In the sheet-metal spinning cutter bar assembly, a second step is further arranged on an inner wall of a side, where the mandrel is inserted, of the bearing seat, and a sealing ring is clamped on the second step.

In the sheet-metal spinning cutter bar assembly, a fixing plate is arranged on an outer wall of a bottom portion of the bearing seat, and an inner side of the fixing plate is provided with an upwardly protruding connecting end abutting against the outer wall of the bearing seat. The fixing plate is further provided with a supporting plate, a top portion of the supporting plate is arranged on the outer wall of the bearing seat in interference fit, and the bottom opposite edge of the supporting plate abuts against the fixing plate.

In the sheet-metal spinning cutter bar assembly, the fixing plate is provided with assembly holes, and the assembly holes are provided with assembly screws therein to strengthen a connection strength between the supporting plate and the fixing plate. The fixing plate is also provided with reinforcing ribs to strengthen a connection strength between the fixing plate and the bearing seat.

In the sheet-metal spinning cutter bar assembly, a hub is arranged between the mandrel and the pulley, and the hub is sleeved on the mandrel. A keyway is arranged between an inner wall of the hub and the mandrel, and a key is clamped in the keyway.

In the sheet-metal spinning cutter bar assembly, a washer is arranged at the joint between the fixing screw and the hub. The pulley is further provided with a plurality of clamping teeth. The pulley is further provided with a plurality of sets of lightening holes.

A processing method of sheet-metal spinning cutter bar assembly comprises the following steps.

Producing spare parts, i.e. producing and processing all parts of the cutter bar assembly.

Step 1. Producing pulleys through steps of blanking, stretching, shaping, trimming, spinning, trimming, punching, welding shaft sleeves, machining inner holes and end surfaces, machining end surfaces, and surface spraying in sequence; producing a fixing plate through steps of blanking, punching, anti-punching, and punching bumps in sequence; producing a supporting plate through blanking, drawing, punching, and shaping in sequence.

Step 2. Welding the supporting plate, connecting the supporting plate on an outer wall of the bearing seat in interference fit, fixing the fixing plate and the bearing seat by welding, and then sleeving the fixing plate and the supporting plate welded together on the bearing seat; making an edge of the supporting plate abut against the fixing plate by spinning an opposite edge to leave no gap between the opposite edge of the supporting plate and the fixing plate, and then punching out the assembly holes by punching operation;

Assembling all parts.

Step 3. Firstly assembling bearings at both ends of the bearing seat, then installing bearing a washer on an outer surface of the bearing, at the same time, inserting the mandrel into the central holes of the bearing seat and the bearing, assembling the pulley at an tail end of the mandrel, assembling a key in a keyway, and fixing the pulley on the tail end of the mandrel by bolts after installation.

During the welding, a current is 130-150 A, a voltage is 20-22V, a diameter of welding wire is 1 mm, usually using JM-56 welding wire, and a flow rate of carbon dioxide gas is 10-16 L/min;

During the stretching, a top cylinder pressure is 1-8 MPa, and a main cylinder pressure is 10-26 MPa.

The sheet-metal spinning cutter bar assembly and the processing method thereof have the following beneficial effects.

In the sheet spinning tool bar assembly according to the present invention, a plurality of sets of lightening holes are arranged on the pulley, which effectively reduces the overall weight of the product, facilitates transportation, and saves energy consumption during work. A fixing plate and a supporting plate are arranged on the bearing seat, which are connected by interference fit and welding, and are provided with reinforcing ribs, which can further strengthen the connection strength between components and improve the stability of the product.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers.

DESCRIPTION OF THE EMBODIMENTS

With reference to the attached drawings, the specific embodiments of the present invention will be further described below to make the technical solution of the present invention easier to understand and implement.

Figure 1:
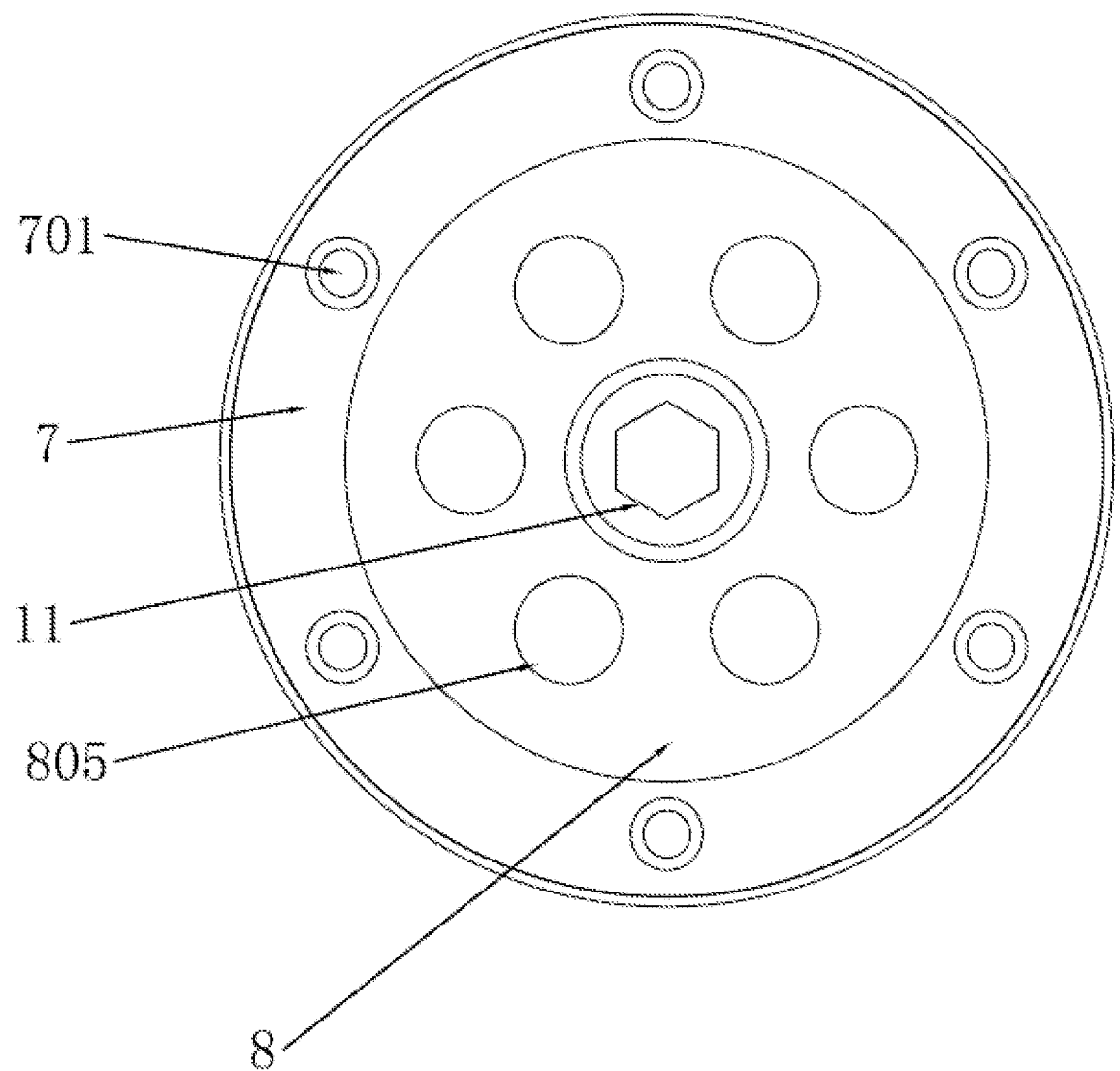
FIG. 1 is a schematic diagram of a cutter bar assembly of the present invention from the bottom view.
Figure 2:
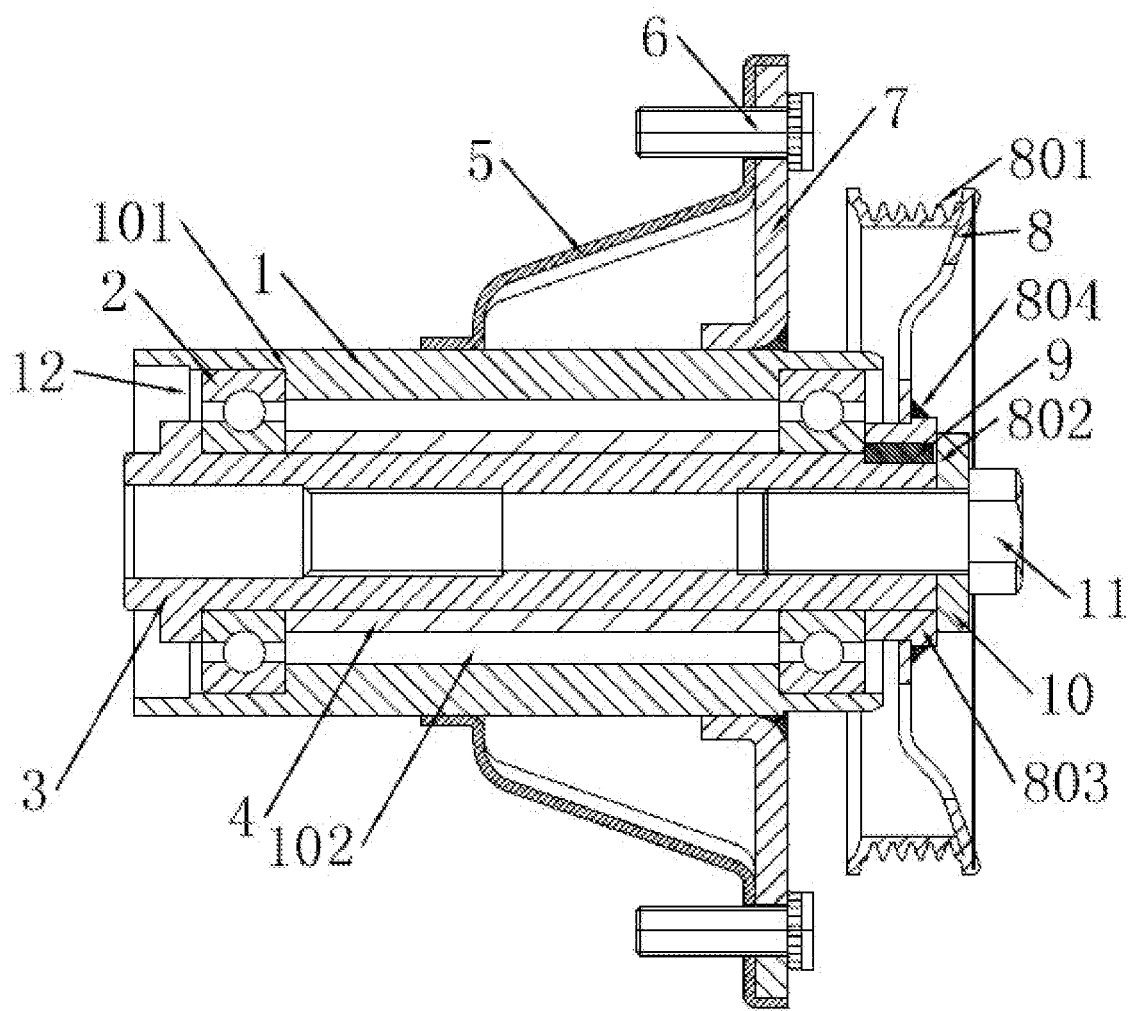
FIG. 2 is a schematic structural diagram of the cutter bar assembly of the present invention.
Figure 3:
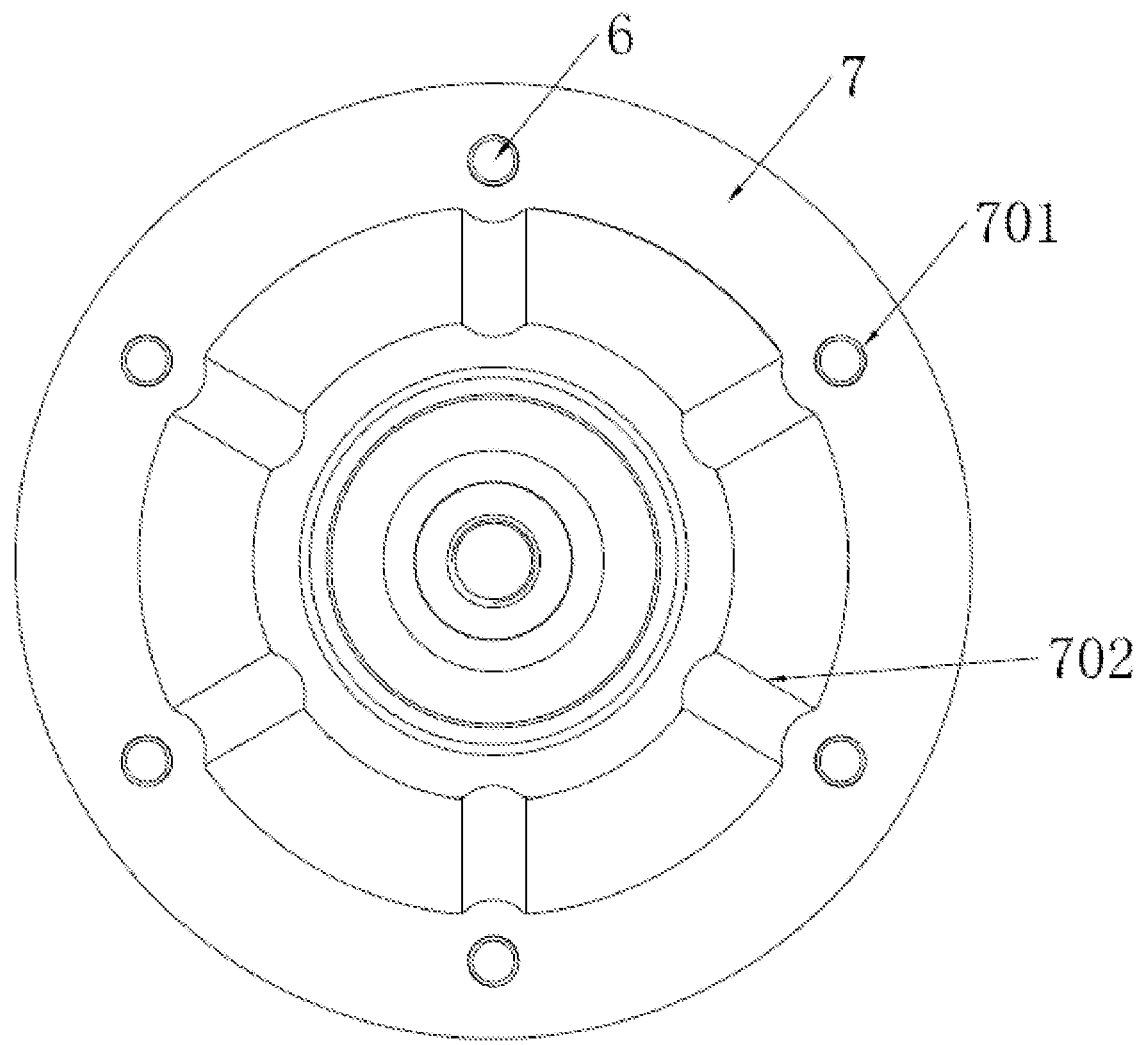
FIG. 3 is a schematic view of the cutter bar assembly of the present invention from the top view.

With reference to FIG. 1 to FIG. 3, a sheet-metal spinning cutter bar assembly comprises a cutter bar body, and one end of the cutter bar body is provided with a pulley 8 through a fixing screw.

The body of the cutter bar comprises a bearing seat 1, an inner wall of the bearing seat is provided with first steps 101, and both ends of the bearing seat 1 are respectively provided with the first steps 101. The bearing 2 is clamped on the first steps 101, and then a mandrel 3 is inserted into an inner ring of the bearing to fix the limiting bearing 2. A shaft sleeve 4 for supporting is also arranged between the bearings 2 at both ends, and the shaft sleeve 4 is arranged between the mandrel 3 and the bearing seat 1. A cavity 102 is arranged between the shaft sleeve 4 and the inner wall of the bearing seat, and 30%-60% of the cavity 102 is filled with yellow grease.

A top end of the mandrel 3 is provided with a baffle ring, a bottom portion of the baffle ring abuts against the bearing, and a top portion of the baffle ring is provided with a connecting platform or connecting thread to fix the blade.

In a more preferable embodiment, a second step is further arranged on the inner wall of a side, where the mandrel is inserted, of the bearing seat. A sealing ring 12 is clamped on the second step, and the sealing ring 12 is used for protecting the bearing 2 arranged inside the bearing seat 1.

A fixing plate 7 is welded on an outer wall of a bottom portion of the bearing seat 1 through a projection welding process, and an inner side of the fixing plate 7 is provided with an upwardly protruding connecting end which abuts against the outer wall of the bearing seat 1. The fixing plate 7 is provided with assembly holes 701, in which assembly screws 6 is provided to fix the supporting plate 5 on the fixing plate 7. A connecting end is arranged at a top portion of the supporting plate 5, and the connecting end is arranged on the outer wall of the bearing seat 1 in interference fit.

The pulley 8 is fixedly arranged at a tail end of the mandrel 3 by a fixing screw 11, a hub 803 is arranged between the mandrel 3 and the pulley 8, and the hub 803 and the pulley are welded at a welding point 804 by projection welding. The hub 803 is sleeved on the mandrel 3, a keyway 802 is arranged between the hub 803 and the mandrel 3, and a key 9 is clamped in the keyway. A washer 10 is also provided at the joint between the fixing screw 11 and the hub 803 to improve stability.

Furthermore, the pulley 801 is provided with a plurality of clamping teeth 801. In order to reduce the overall weight of the product, the pulley 8 is also provided with a plurality of sets of lightening holes 805. In this embodiment, there are six sets of lightening holes 805. The fixing plate 7 is further provided with reinforcing ribs 702 to strengthen a connection strength between the fixing plate 7 and the bearing seat 1. A surface of the cutter bar assembly is further sprayed with black paint for rust prevention.

A processing method of sheet-metal spinning cutter bar assembly comprises the following steps.

Producing spare parts, i.e. producing and processing all parts of the cutter bar assembly.

Step 1: producing pulleys through steps of [1] blanking, [2] stretching, [3] shaping, [4] trimming, [5] spinning, [6] trimming, [7] punching, [8] welding shaft sleeves, [9] machining inner holes and end surfaces, [10] machining end surfaces, and [11] surface spraying in sequence;

producing a fixing plate through steps of [1] blanking, [2] punching, [3] anti-punching, and [4] punching bumps; and producing a supporting plate through [1] blanking, [2] drawing, [3] punching, and [4] shaping.

Step 2: projection-welding the supporting plate, and fixing an edge of the supporting plate on the fixing plate by spinning an opposite edge so that there is no gap between the supporting plate and the opposite edge of the fixing plate, then punching out the assembly holes by punching operation, then sleeving the welded fixing plate and the supporting plate on the bearing seat, connecting the supporting plate to the outer wall of the bearing seat in interference fit, and fixing the fixing plate and the bearing seat by welding.

Assembling all parts.

Step 3: firstly assembling bearings at both ends of the bearing seat, then installing bearing a washer on the outer surface of the bearing, at the same time, inserting the mandrel into the central holes of the bearing seat and the bearing, assembling the pulley at the tail end of the mandrel, assembling a key in a keyway, and fixing the pulley on the tail end of the mandrel by bolts after installation.

During the welding, a current is 130-150 A, a voltage is 20-22V, a diameter of welding wire is 1 mm, usually using JM-56 welding wire, and a flow rate of carbon dioxide gas is 10-17 L/min.

During the stretching, a top cylinder pressure is 1-8 MPa, and a main cylinder pressure is 10-27 MPa.

Blanking: punching the cut steel plate on a punching machine to obtain a blank with a circular plane cross section.

Stretching: placing the blank with a circular plane cross section between an upper die and a lower stretching die of the stretching die, and stretching it into a barrel-shaped pulley blank through the positioning ring on the stretching dies.

Punching: punching out the center hole, assembly hole, lightening holes, etc. under positioning by the punching positioning ring.

Shaping and trimming: placing the barrel-shaped pulley blank between an upper shaping die and a lower shaping die of a shaping die, and pressing it, forming a central spoke part and a transition spoke part on the spoke blank when the upper shaping die and the lower shaping die reach a predetermined pressure, returning the material under the action of a material returning block and an ejector rod of the shaping die, and then cutting the rim blank to the height size required by the process by a lathe to obtain a first-class semi-finished blank.

Spinning: placing the first-class semi-finished blank in a spinning die, then first preliminarily spinning the rim blank according to the technological requirements by using a preforming wheel, and then performing forming spinning on the rim blank after preliminary spinning by using a forming wheel according to the technological requirements.

The above exemplary description of the present invention is made with reference to the drawings. Obviously, the realization of the present invention is not limited by the above-mentioned ways, and it is within the protection scope of the present invention as long as various improvements are made by adopting the methods, concepts and technical solutions of the present invention, or the concepts and technical solutions of the present invention are directly applied to other occasions without improvement.

What is claimed is:

1. A sheet-metal spinning cutter bar assembly, comprising a cutter bar body, wherein one end of the cutter bar body is provided with a pulley through a fixing screw, the cutter bar body comprises a bearing seat, two ends of the bearing seat are respectively provided with bearings, a mandrel is inserted into the bearing seat, and a tail end of the mandrel is connected with the pulley;
   a fixing plate is arranged on an outer wall of a bottom portion of the bearing seat, and an inner side of the fixing plate is provided with an upwardly protruding connecting end abutting against the outer wall of the bearing seat; and
   the fixing plate is further provided with a supporting plate, a top portion of the supporting plate is arranged on the outer wall of the bearing seat in interference fit, and a bottom opposite edge of the supporting plate abuts against the fixing plate.

2. The sheet-metal spinning cutter bar assembly according to claim 1, wherein the two ends of the bearing seat are respectively provided with first steps, and the bearings are respectively clamped on the first steps.

3. The sheet-metal spinning cutter bar assembly according to claim 1, wherein a shaft sleeve is arranged between the two bearings, and the shaft sleeve is arranged between the mandrel and the bearing seat; a cavity is arranged between the shaft sleeve and an inner wall of the bearing seat, a yellow grease layer is filled in the cavity, and 30%-60% of the cavity is filled with yellow grease.

4. The sheet-metal spinning cutter bar assembly according to claim 1, wherein a top end of the mandrel is provided with a baffle ring, a bottom portion of the baffle ring abuts against the bearing, and a top portion of the baffle ring is provided with a connecting platform for fixing a blade.

5. The sheet-metal spinning cutter bar assembly according to claim 1, wherein a second step is further arranged on the inner wall of a side, where the mandrel is inserted, of the bearing seat, and a sealing ring is clamped on the second step.

6. The sheet-metal spinning cutter bar assembly according to claim 1, wherein the fixing plate is provided with assembly holes, and the assembly holes are provided with assembly screws therein to strengthen a connection strength between the supporting plate and the fixing plate;
   the fixing plate is further provided with reinforcing ribs to strengthen a connection strength between the fixing plate and the bearing seat.

7. A sheet-metal spinning cutter bar assembly, comprising a cutter bar body, wherein one end of the cutter bar body is provided with a pulley through a fixing screw, the cutter bar body comprises a bearing seat, two ends of the bearing seat are respectively provided with bearings, a mandrel is inserted into the bearing seat, and a tail end of the mandrel is connected with the pulley, wherein
   a hub is arranged between the mandrel and the pulley, and the hub is sleeved on the mandrel; a keyway is arranged between an inner wall of the hub and the mandrel, and a key is clamped in the keyway;
   a washer is arranged at a joint between the fixing screw and the hub;
   the pulley is provided with a plurality of clamping teeth; and
   the pulley is further provided with a plurality of sets of lightening holes.

8. A processing method of sheet-metal spinning cutter bar assembly, the processing method comprising the following steps:
   step 1: producing pulleys through blanking, stretching, shaping, trimming, spinning, trimming, punching, welding shaft sleeves, machining inner holes and end surfaces, machining end surfaces, and surface spraying in sequence; producing a fixing plate through blanking, punching, anti-punching, and punching bumps in sequence; and producing a supporting plate through blanking, drawing, punching, and shaping in sequence;
   step 2: welding the supporting plate, connecting the supporting plate on an outer wall of the bearing seat in interference fit, fixing the fixing plate and the bearing seat by welding, and then sleeving the fixing plate and the supporting plate welded together on the bearing seat; making an edge of the supporting plate abut against the fixing plate by spinning an opposite edge to leave no gap between the opposite edge of the supporting plate and the fixing plate, and then punching out the assembly holes by punching operation; and
   step 3: firstly assembling bearings at both ends of the bearing seat, then installing a washer on an outer surface of the bearing, at the same time, inserting a mandrel into central holes of the bearing seat and the bearing, assembling the pulley at an tail end of the mandrel, assembling a key in a keyway, and fixing the pulley on the tail end of the mandrel by bolts after installation,
   wherein, during the welding, a current is 130-150 A, a voltage is 20-22V, a diameter of welding wire is 1 mm, usually using JM-56 welding wire, and a flow rate of carbon dioxide gas is 10-15 L/min; during the stretching, a top cylinder pressure is 1-8 MPa, and a main cylinder pressure is 10-25 MPa.

* * * * *